United States Patent

Rutkowski

[15] 3,645,716
[45] Feb. 29, 1972

[54] NEODECANOIC ACID AS A POSTEMERGENT HERBICIDE

[72] Inventor: Alfred J. Rutkowski, Colonia, N.J.

[73] Assignee: Esso Research and Engineering Company

[22] Filed: Oct. 3, 1969

[21] Appl. No.: 863,716

Related U.S. Application Data

[63] Continuation-in-part of Ser. No. 687,145, Dec. 1, 1967, abandoned.

[52] U.S. Cl. ...........................71/113, 71/127, 71/DIG. 1
[51] Int. Cl. .............................................A01n 9/04, A01n 9/24
[58] Field of Search ...................................................71/113

[56] References Cited

UNITED STATES PATENTS

| | | | |
|---|---|---|---|
| 2,626,862 | 1/1953 | Zimmerman et al. | 71/113 |
| 2,633,418 | 3/1953 | Scott et al. | 71/113 |
| 2,988,440 | 6/1961 | Bartlett et al. | 71/70 |
| 3,001,862 | 9/1961 | Sowa | 71/70 |
| 3,148,049 | 9/1964 | Herschler | 71/113 |
| 3,244,503 | 4/1966 | Watts | 71/92 |
| 3,272,693 | 9/1966 | Harrison | 424/316 |
| 3,321,294 | 5/1967 | Miller et al. | 71/88 |

FOREIGN PATENTS OR APPLICATIONS

625,361  8/1961  Canada...................................71/113

OTHER PUBLICATIONS

Tso, Nature 202, 511– 512 (1964).

*Primary Examiner*—Lewis Gotts
*Assistant Examiner*—Melvyn Kassenoff
*Attorney*—Chasan and Sinnock and John P. Corcoran

[57] ABSTRACT

Neodecanoic acid, preferably formulated with a suitable solvent such as for example heavy aromatic naptha and a suitable emulsifier, such as for example, alkylated aryl polyether alcohol or a blend of anionic and nonionic emulsifiers, such as an alkylated aryl polyether alcohol plus a sulfonate has been found to be especially useful as a broad base postemergent herbicide when it is directly sprayed at the base of a growing crop at a time when the crop is at least twice the height of the weed. By using this acid in such a manner, it functions as a selective weed killer which does not cause injury to the crops when sprayed on a directed spray postemergence basis.

5 Claims, No Drawings

NEODECANOIC ACID AS A POSTEMERGENT HERBICIDE

The subject application is a continuation-in-part of an application bearing U.S. Ser. No. 687,145 filed Dec. 1, 1967 on an invention entitled "Carboxylic Acids and Derivatives Thereof as Broad Base, Post Emergence Herbicides" having as the inventor Alfred J. Rutkowski and now abandoned.

This invention relates to the novel use of neodecanoic acid as a broad base, post emergence herbicide. In one aspect, this invention relates to the use of neodecanoic acid as a selective weed killer for certain specific crops such as, e.g., cotton, soy beans, oats, rice, potatoes, and so forth.

In the prior art, a number of carboxylic acid derivatives have been shown to be biologically active as either preemergence or postemergence herbicides. For example, branched and straight chain mono and dicarboxylic acids have been disclosed in the following patents.

| Patentee | Patent No. | Date Issued |
|---|---|---|
| Newcomer | U.S. 2,618,545 | 1952 |
| Zimmerman et al. | U.S. 2,622,975 | 1952 |
| Scott et al. | U.S. 2,633,418 | 1953 |
| Pumpelly | U.S. 2,852,555 | 1958 |
| Brugmann et al. | U.S. 2,945,753 | 1960 |
| Bartlett et al. | U.S. 2,988,440 | 1961 |
| Mittelberger et al. | U.S. 2,993,777 | 1961 |
| Sowa | U.S. 3,001,862 | 1961 |
| Lippincott et al. | U.S. 3,089,904 | 1963 |
| Zimmerman et al. | U.S. 2,626,862 | 1953 |
| Koopman et al. | 625,361 | 1961 (Canada) |
| Scherer et al. | 1,088,758 | 1960 (W. Germany) Auslegeschrift |

In all of the above prior art, there is no suggestion, showing or teaching that neodecanoic acid would be useful as a postemergent herbicide and furthermore, it what manner it had to be used in order to make it an effective postemergent herbicide.

U.S. Pat. No. 2,988,440, issued to Bartlett, does mention that neodecanoic acid possesses utility as a defoliant. Furthermore, Bartlett states that the concentration of the neodecanoic acid in his defoliating composition is critical as it must be sufficient to effect the desired defoliation without deleteriously affecting the remainder of the plant. Therefore, there is some suggestion in the Bartlett reference that neodecanoic acid causes permanent injury to plants.

Such a teaching by Bartlett would in no way be suggestive of the fact that such an acid could be a selective weedkiller under certain conditions; for, as is well known in the art, utility as a defoliant does not of itself suggest other facets of pesticidal activity, such as, e.g., herbicidal activity. This is perhaps best illustrated by the fact that 7 USC 135—135 k Section 2(f) and (i), includes separate definitions of herbicide and defoliant, respectively, thereby indicating that each of these terms has acquired a distinct and definite status in the art. Furthermore, in this regard known defoliants such as s,s,s,-tributylthiophosphate, s,s,s,-tributylthiophosphite, ammonium nitrate, calcium cyanamide, magnesium chlorate, etc., have been shown to possess no other form of biological activity.

In general, defoliants are used only when crops are of such maturity that the application of a defoliant will not lower their yield or quality. Accordingly, the main purpose of a defoliant is to prepare the crop for harvest and not to kill weeds. Thus, it is well know that weeds, such as Johnsongrass, cockleburr, teaweed, and morning-glory, which may be mature and in growing crop fields like cotton for example, can at the time of harvest cause difficulties during harvest and are not killed by defoliants, such as organothiophosphates, which were previously applied to the field prior to harvest. Therefore defoliants are generally known in the art for their inability to act as herbicides.

The commonly used defoliants cited above are never used as herbicides during the growing of a crop and specifically are not recommended for use on the crop except when the crop, e.g., cotton is about 70 percent mature and ready for harvest. From the foregoing it is clear that if defoliants did in fact possess herbicidal activity, their use would not be restricted to the period of maturity of the crop as is now the case but would be extended to include the actual growing period of the crop.

It has now been found that an agricultural composition comprising as the active ingredient thereof, neodecanoic acid in an amount sufficient to be herbicidally effective as a postemergent herbicide of a wide variety of undesired plants, vegetation and foliage, preferably weeds, such as, e.g., ryegrass, bluegrass, fescue, pigweed, setaria, Johnsongrass, coffeebean, wild oats, wild mustard, etc., and selective weed killers as well, not proving injurious, on a postemergence basis, to crops such as beets, tomatoes, radishes, cucumbers, red kidney beans, cotton, soybeans, oats, wheat, rice, milo, corn, cabbage, turnips, peanuts, potatoes, watermelon, flax, onions, lettuce, peas, etc., and mixtures thereof growing, and treated, concurrently with at least one or more of the foregoing enumerated weeds present.

In accordance with a preferred embodiment of this invention there is provided a method of combating growth of undesired weeds comprising the step of directly spraying as a postemergence basis at the base of the crop, a composition containing a herbicidally effective amount of neodecanoic acid at a time when the crop is at least as high as is a weed desired to be removed and growing in the proximity of the crop, whereby said weed is destroyed without affecting said crop.

The neodecanoic acid employed in the postherbicide composition is a branched chain carboxylic acid at least 75 percent of which is of the trialkyl acetic acid configuration, i.e.,

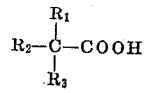

containing a mixture of isomers wherein the total number of carbon atoms is 10.

In accordance with one aspect of this invention, the herbicidal composition that comprises the active ingredient, i.e., the neodecanoic acid, may be applied in the form of an aqueous emulsion, an aqueous solution, or in the form of a hydrocarbon solution utilizing a phytotoxic solvent or carrier, said carrier being inert in its relationship with said acid. When the herbicidally active ingredient is applied as an aqueous emulsion, the emulsifier used preferably comprises an essentially aromatic, phytotoxic, hydrocarbon carrier or a mixture of aromatic hydrocarbons in such a carrier, such as: naphtha (boiling range of about 90° to 100° C.); petroleum fractions such as kerosene, diesel oil, and the like; straight run mineral spirits, such as Varsol (boiling range of about 150° to 250° C.), and preferably aromatic hydrocarbons such as toluene, xylene, and the like, preferably heavy aromatic naphthas (boiling range of 150° to 300° C.). The invention also contemplates the use of phytotoxic, oxygenated solvents, such as tetrahydrofuran, dioxane, ethylene glycol, mono and diethers, alcohols, ketones, esters, and the like.

By the terminology "phytotoxic solvent" is meant a solvent having phytotoxic or injurious effects upon plants. While it is not desired or intended to limit the scope of this invention by any theory, the following discussion concerning the mechanism by which phytotoxicity is believed to be effected on plants is included so as to afford additional emphasis upon the nature of the solvent employed in this invention.

Phytotoxicity by solvents is believed caused by denaturization of the plasma membranes of plant cells resulting from solubilization of such membranes by the solvent. The phytotoxic response results from partition of the solvent into the membrane, thereby causing a greatly increased permeability followed by leakage of cell sap into the intercellular spaces of the leaves and consequent death of the cells.

The degree of phytotoxicity of a given solvent is therefore dependent upon its effectiveness as a solvent for the leaf cuticle and its ability to partition into the leaf membrane. Accordingly, the property of solvent phytotoxicity will vary with the inherent nature of its solvency toward leaf cuticle, and thus will vary in accordance with the nature of the given solvent. For example, solvents such as methanol or acetone, etc., although generally poor solvents for leaf cuticle, may nevertheless be phytotoxic if used in sufficient quantity. On the other hand, solvents such as aromatic hydrocarbons, glycol ethers or their acetates, etc., which are known to have a high degree of solvency for leaf cuticle, are much more phytotoxic at lower use or dosage levels. With respect to the aromatic character or content of aromatic hydrocarbons, it is ordinarily and generally accepted that such aromatic content must be greater than about 25 percent in order for such hydrocarbons to be effective phytotoxic solvents at the low dosage levels of conventional practice. In the preferred embodiment of this invention, therefore, the preferred phytotoxic solvents intended for use, such as, e.g., heavy aromatic naphtha, must be utilized in a manner such that the weight ratio of solvent to active ingredient in the final herbicide composition or formulation is within the range of from about 0.2 to 4, preferably from about 0.4 to about 2.

The agricultural herbicide compositions of this invention are ordinarily prepared or formulated in the form of emulsifiable concentrates containing from about 30 to about 75 weight percent or higher of the active ingredient (or ingredients if mixtures are used), from about 20 to about 60 weight percent of the solvent, e.g., a hydrocarbon solvent, and from about 5 to about 10 weight percent of hydrocarbon soluble emulsifying agent. These concentrates can be diluted in the field with water or another suitable solvent or diluent material so that the emulsifiable concentrate constitutes from about 10 to about 70 volume percent of the total aqueous emulsion formulation and provides at least about 10 weight percent of the carboxylic acid.

The term "emulsifying agent" as used herein shall be understood to connote generically the various emulsifying agents and the like that are adapted to be admixed with the active ingredient and hydrocarbon solvent of this invention in order to effect the formation of stable emulsion when the emulsifiable concentrate is diluted with water. Other surfactants, such as wetting agents, or "spreading-sticking" compounds, which "spreading-sticking" compounds are combinations of surfactants and hydrophylic materials, usually polymers, e.g., polyvinylalcohol, which are said to enhance the persistence of the active ingredient on the crop or foliage of the crop and aid in the penetration of the active ingredient into the plant—can also be included into the emulsifiable concentrate or into the water for dilution of the emulsifiable concentrate.

Among the hydrocarbon-soluble emulsifying agents that may be suitably employed are the alkali metal salts of sulfates of long, straight or branched chain alcohols such as dodecanol up to octadecanol, sulfonated amide and ester derivatives, sulfonated aromatic and mixed alkyl-aryl sulfonated derivatives, esters of fatty acids such as ricinoleic acid, the esters of sorbitol, and salts of the petroleum sulfonic acids, the alkali metal salts of the last named being preferred.

The nonionic emulsifying agents, such as the ethylene oxide condensation products of alkylated phenol, alcohols, or amines may also be used. In addition, blends of the foregoing can be utilized in the present invention. Exemplary of such nonionic emulsifiers include Sponto 55, a blend of alkylphenol polyoxyethylene ethers plus sulfonates; Surfonic N-95, a nonyl phenol 9.5 mole ethylene oxide adduct; Triton X-151, a blend of alkylaryl polyether alcohols with organic sulfonates, and others such as Sponto 33; Triton X-161, X-171, X-152; etc.

The aqueous emulsion is applied to the plants or given crops at a rate of 2 to about 25 gallons per acre, preferably 5 to about 15 gallons per acre, with conventional ground spray equipment.

When the active ingredient is applied as an aqueous emulsion, it is diluted with sufficient water to supply it in a volume of from about 2 to about 20 gallons per acre, preferably from about 5 to about 15 gallons per acre and to provide at least about 10 weight percent of the carboxylic acid utilized.

When the active ingredient is applied in a hyrocarbon solution, the final agricultural composition preferably consists essentially of the active ingredient in an aromatic hydrocarbon carrier such as naphtha, preferably a heavy aromatic naphtha (boiling point range: 150° to 300° C.); petroleum fractions such as kerosene, diesel oil, and the like; straight run mineral spirits, such as Varsol; and essentially aromatic hydrocarbons such as toluene, xylene, and the like, The other similarly inert solvents previously described are also usable, individually, or in admixture with each other and their formulations are prepared and used in accordance with the general procedures previously described.

The agricultural, herbicidal compositions or formulations of this invention, their evaluation as herbicides, and their methods of preparation are further illustrated in the following examples but it is to be understood that they should not be construed as limiting the invention in any manner whatsoever.

EXAMPLE 1

In this Example, a neodecanoic acid (NDA) formulation was prepared containing 30 weight percent NDA, 60 weight percent heavy aromatic naphtha as solvent and 10 percent emulsifier (Surfonic N-95) and was applied in a total spray volume of 40 gallons (diluted with water) per acre at various dosages of neodecanoic acid on a number of crops and weeds listed in Table I below. Phytotoxicity ratings (P.R. ratings) were based on a scale of 0 to 10 in which 0 indicated no injury and 10 indicated complete kill. Ratings were made 10 days after application and are included in Table I.

These ratings were obtained after a band treatment based on an amount per acre of crop land applied to 14-inch bands on 42-inch rows.

TABLE I

[Post emergence herbicidal evaluation of neo-decanoic acid (NDA)]

| Dosage of NDA (lbs./acre) | Phytotoxicity ratings on a banded treatment | | | | |
|---|---|---|---|---|---|
| | 20 | 10 | 5 | 2.5 | 1.25 |
| Crops and weeds: | | | | | |
| Beets | 10 | 8 | 7 | 3 | 1 |
| Tomato | 10 | 10 | 5 | 3 | 2 |
| Radish | 10 | 9+ | 6 | 5 | 1 |
| Cucumber | 10 | 10 | 10 | 8 | 3 |
| Red kidney beans | 10 | 10 | 7 | 5 | 2 |
| Cotton | 9 | 5 | 2 | 0 | 0 |
| Soybeans | 8 | 7 | 6 | 5 | 4 |
| Oats | 9 | 9 | 4 | 5 | 1 |
| Wheat | 10 | 9 | 8 | 7 | 2 |
| Rice | 7 | 5 | 4 | 3 | 1 |
| Milo | 9 | 9 | 6 | 6 | 4 |
| Corn | 10 | 10 | 10 | 10 | 4 |
| Cabbage | 10 | 10 | 10 | 6 | 7 |
| Turnips | 10 | 10 | 10 | 9 | 8 |
| Peanuts | 8 | 6 | 5 | 3 | 1 |
| Potato | 6 | 5 | 5 | 1 | 0 |
| Watermelon | 10 | 10 | 7 | 5 | 2 |
| Flax | 10 | 10 | 10 | 9 | 5 |
| Onion | 10 | 9 | 9 | 5 | 2 |
| Lettuce | 10 | 9 | 9 | 8 | 0 |
| Peas | 10 | 9 | 8 | 4 | 3 |
| Rye grass | 9 | 6 | 4 | 2 | 1 |
| Blue grass | 10 | 10 | 4 | 2 | 0 |
| Fescue | 10 | 9 | 7 | 5 | 2 |
| Pigweed (Amaranthus sp.) | 10 | 9+ | 5 | 6 | 1 |
| Setaria | 9 | 8 | 5 | 4 | 1 |
| Johnson grass: | | | | | |
| Small | 10 | 10 | 10 | 5 | 2 |
| Medium | 10 | 10 | 9+ | 5 | 5 |
| Large | 10 | 10 | 10 | 8 | 4 |
| Coffee bean | 10 | 10 | 10 | 5 | 2 |
| Wild oats | 10 | 10 | 5 | 4 | 1 |
| Wild mustard (seedling) | 10 | 10 | 10 | 10 | 10 |
| Japanese Chess: | | | | | |
| Bromus | 10 | 7 | 6 | 3 | 1 |
| Japonica | 9+ | 6 | 4 | 4 | 3 |
| Crabgrass | 9 | 8 | 7 | 5 | 4 |
| Bindweed (Convolvalus sp.) | 10 | 10 | 9 | 5 | 2 |
| Dock (Rumex crispus) | 10 | 10 | 10 | 9 | 5 |
| Swart weed (Polyzonum sp.) | 10 | 9+ | 8 | 6 | 2 |
| Portulaca | 10 | 10 | 5 | 4 | 2 |
| Ragweed (Ambrosia sp.) | 9+ | 9+ | 4 | 4 | 2 |
| Wild Buckweed (Fagopysum sp.) | 10 | 9+ | 7 | 6 | 2 |
| Canada thistle (seedling) | 10 | 10 | 10 | 10 | 10 |
| Towles quarter (Chenopodium albun) | 10 | 9+ | 6 | 4 | 2 |
| Wild mustard (flower) | 10 | 10 | 7 | 7 | 3 |

The foregoing data indicate that NDA is a broad base herbicide and also, when used with certain crops such as beets, tomatoes, radishes, cucumbers, etc., is a selective weedkiller.

EXAMPLE 2 (Comparisons of Phytotoxicities of Various Solvents)

In this example, the phytotoxicity of various solvents was compared on the basis of a formulation consisting of 30 percent active ingredient (neodecanoic acid), 60 percent solvent and 10 percent emulsifier (Surfonic N–95). The ratio of solvent to active ingredient was 2. The phytotoxicity (P.R.) and the total activity were determined on cotton leaves.

TABLE II

| Solvent | lbs. of Active Ingredient per Acre | | | |
|---|---|---|---|---|
| | 6.6 lbs. (NDA) | | 13.2 lbs. (NDA) | |
| | P.R. | % activity | P.R. | % activity |
| Light Mineral Oil | 3 | 20 | 5 | 50 |
| Heavy Mineral Oil | 1 | 10 | 2 | 20 |
| Methyl Isobutyl Ketone | 1 | 15 | 2 | 25 |
| Methanol | 1 | 10 | 2 | 25 |
| Ethylene Glycol | 2 | 10 | 4 | 40 |
| Butyl Carbitol Acetate | 8 | 70 | 10 | 100 |
| Kerosene | 5 | 60 | 8 | 90 |
| Heavy Aromatic Naphtha | 7 | 80 | 9 | 95 |
| Diesel Oil | 6 | 50 | 8 | 80 |

From the foregoing it can be seen that there is a definite phytotoxicity-solvent relationship dependent upon the type solvent used and the dosage of solvent employed.

From the foregoing teachings herein concerning the choice of solvent or solvent system ultimately employed in the preparation of the pesticidal compositions of this invention, it will be understood that variations in solvent or solvent system selection which differ from the exemplary or preferred selections described herein may be made by those skilled in the art without departing from the spirit and purview of this invention.

What is claimed is:

1. A method for controlling Johnsongrass subsequent to its emergence from the soil which comprises the step of directly spraying neodecanoic acid at a rate of 5 pounds per acre at the base of a cotton crop growing in close proximity to the Johnsongrass when the cotton is at least twice the height of the Johnsongrass, said neodecanoic acid being incorporated into a liquid spray material, said spray material being one selected from the group consisting of kerosene, heavy aromatic naphtha and diesel oil.

2. A method for controlling the coffeebean subsequent to its emergence from the soil which comprises the step of directly spraying neodecanoic acid at a rate of 5 pounds per acre at the base of the cotton crop growing in close proximity to the coffeebean when the cotton is at least twice the height of the coffeebean, said neodecanoic acid being incorporated into a liquid spray material, said spray material being one selected from the group consisting of kerosene, heavy aromatic naphtha and diesel oil.

3. A method for controlling wild mustard subsequent to its emergence from the soil which comprises the step of directly spraying neodecanoic acid at a rate of 5 pounds per acre at the base of a cotton crop growing in close proximity to the wild mustard when the cotton is at least twice the height of the wild mustard, said neodecanoic acid being incorporated into a liquid spray material, said spray material being one selected from the group consisting of kerosene, heavy aromatic naphtha and diesel oil.

4. A method for controlling dock subsequent to its emergence from the soil which comprises the step of directly spraying neodecanoic acid at a rate of 5 pounds per acre at the base of the cotton crop growing in close proximity to the dock when the cotton is at least twice the height of the dock, said neodecanoic acid being incorporated into a liquid spray material, said spray material being one selected from the group consisting of kerosene, heavy aromatic naphtha and diesel oil.

5. A method for controlling Canada thistle subsequent to its emergence from the soil which comprises the step of directly spraying neodecanoic acid at a rate of 5 pounds per acre at the base of a cotton crop growing in close proximity to the Canada thistle when the cotton is at least twice the height of the Canada thistle, said neodecanoic acid being incorporated into a liquid spray material, said spray material being one selected from the group consisting of kerosene, heavy aromatic naphtha and diesel oil.